(12) United States Patent
Coste

(10) Patent No.: US 9,411,060 B2
(45) Date of Patent: Aug. 9, 2016

(54) ELECTROMAGNETICALLY DRIVEN MARINE VIBRATOR

(71) Applicant: WESTERNGECO L.L.C., Houston, TX (US)

(72) Inventor: Emmanuel Coste, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 718 days.

(21) Appl. No.: 13/855,601

(22) Filed: Apr. 2, 2013

(65) Prior Publication Data

US 2013/0272089 A1     Oct. 17, 2013

Related U.S. Application Data

(60) Provisional application No. 61/619,879, filed on Apr. 3, 2012.

(51) Int. Cl.
| | |
|---|---|
| *G01V 1/04* | (2006.01) |
| *G01V 1/02* | (2006.01) |
| *G01V 1/133* | (2006.01) |
| *G01V 1/145* | (2006.01) |

(52) U.S. Cl.
CPC .............. *G01V 1/133* (2013.01); *G01V 1/145* (2013.01)

(58) Field of Classification Search
CPC ............................... G01V 1/133; G01V 1/145
USPC .................. 367/143, 174, 175; 181/113, 120
See application file for complete search history.

(56) References Cited

U.S. PATENT DOCUMENTS

| | | | | |
|---|---|---|---|---|
| 3,466,017 | A | * | 9/1969 | Malvin ......................... 366/117 |
| 4,153,135 | A | | 5/1979 | Bouyoucos |
| 4,821,246 | A | | 4/1989 | van Kampen et al. |
| 4,905,517 | A | | 3/1990 | Crowe et al. |
| 5,959,939 | A | * | 9/1999 | Tengham et al. ............. 367/174 |
| 5,969,297 | A | | 10/1999 | Ambs |
| 5,978,316 | A | | 11/1999 | Ambs et al. |
| 6,076,629 | A | | 6/2000 | Tengham |
| 8,670,292 | B2 | * | 3/2014 | Engdahl ........................ 367/175 |
| 2003/0221901 | A1 | | 12/2003 | Tenghamn |
| 2010/0232260 | A1 | | 9/2010 | Zowarka et al. |

OTHER PUBLICATIONS

International Search Report and Written Opinion of PCT Application No. PCT/US2013/035078 dated Jul. 18, 2013: pp. 1-13.

* cited by examiner

*Primary Examiner* — Ian J Lobo
(74) *Attorney, Agent, or Firm* — Kevin B. McGoff

(57) ABSTRACT

A marine vibrator has a housing that comprises a displacement member, the displacement member having a first position and a second position, the housing and the displacement member together defining an internal volume. A linear electromagnetic motor interacts with the displacement member so as to move the displacement member between a first position and a second position and correspondingly strokes the displacement member to cover a volume. The linear electromagnetic motor comprises magnets and coils that when energized create an electromagnetic force there between, wherein the linear electromagnetic motor comprises a piston and a guide that substantially surrounds the piston. The piston has incorporated therein either the coils or the magnets, and the guide having incorporated therein the other of the coils or the magnets. The piston is in interaction with the displacement member.

17 Claims, 3 Drawing Sheets ns of features described in the present disclosure. It is not meant in any way to unduly limit the present or subsequent claims scope of any claims of this or related applications.

According to an embodiment a marine vibrator has a housing. A displacement member interacts with the housing, thereby defining an internal volume, the displacement member having a retracted position and an extended position. A linear electromagnetic motor interacts with the displacement member and alternates the displacement member between the retracted position and the extended position.

According to another embodiment, a method of marine seismic exploration includes operating a marine vibrator that has a housing and a displacement member. The housing and the displacement member together define an internal volume that is separate from an external volume. The method includes driving a linear electromagnetic motor to move the displacement member between a retracted position and an extended position wherein the volume covered by a stroke between the retracted position and the extended position is at least 25 L and the frequency of the stroke is in the range of 1-15 Hz.

ELECTROMAGNETICALLY DRIVEN MARINE VIBRATOR

CROSS REFERENCE TO RELATED APPLICATION

This application claims the benefit of U.S. Provisional Patent Application Ser. No. 61/619,879 filed on Apr. 3, 2012, which is incorporated herein by reference in its entirety.

TECHNICAL FIELD

The present disclosure relates to marine geophysical exploration and in particular to a vibratory source that is useful in marine geophysical exploration and is driven electromagnetically by a linear electromagnetic motor.

BACKGROUND

Seismic sources, including vibratory sources, can be utilized in geophysical exploration in water covered areas of the earth. Signals can be generated by those sources in the water so that they travel downwardly into the Earth's seabed and are reflected from geological formations in the Earth and are detected by signal detectors such as hydrophones, geophones, accelerometers, pressure sensors, and such. In marine applications, the signals are generated in the body of water and travel into the Earth, while the signal detectors are in the body of water and can be near the seabed surface or the water surface.

Acoustic sources can be employed in marine operations that are impulsive (such as air guns). These are generally intended to generate as much energy as possible during as short a time span as possible. The frequency content of such sources is controllable only to a small degree, and different sources are selected for the generation of different frequency ranges for different surveying needs. The lack of frequency control can be relevant because, in connection with creating a large amount of energy, high frequency portions of the signal are normally produced. An issue with this is that impulsive sources can to a degree disrupt mammalian activities and therefore use of lower frequency sources that exclude high frequency components can be desirable. Additionally, it has been found that in various applications lower frequency sources are desirable for various surveys. Further, outside the lower frequency ranges, it is still desirable to have added frequency control and variation without requiring interchange of different sources.

One way of addressing the air gun limitations with respect to frequency has been with a marine vibrator. A marine vibrator produces a desired displacement of water at frequency. One way to drive a marine vibrator is with a hydraulic motor. However, there are some drawbacks with hydraulically driven vibrators, such as potential leakage of hydraulic fluid (oil) into the ocean. Also, hydraulically driven vibrators are inherently be non-linear and thus tend to produce an undesired harmonic.

An example of a hydraulically driven vibrator can be found in U.S. Pat. No. 4,153,135 that was filed on Sep. 30, 1977, which is incorporated herein by reference.

Another way of driving a marine vibrator is with a linear electromagnetic motor. The present disclosure relates to a number of embodiments of a linear electromagnetically driven marine vibrator having combinations of features that improve the design and performance of marine vibrators.

SUMMARY

The following summary is meant to aid the understanding of one skilled in the art with respect to the various combina-

BRIEF DESCRIPTION OF THE DRAWINGS

The following brief description of the drawings provides a short description of each drawing to help the understanding of one skilled in the art. It is not mean to unduly limit any present or future claims related to the present disclosure.

DETAILED DESCRIPTION

The following detailed description is meant to help one skilled in the art understand the various embodiments and combinations of features disclosed in the present disclosure. It is not meant in any way to unduly limit any present or future related claims in connection with this application.

Figure 1:
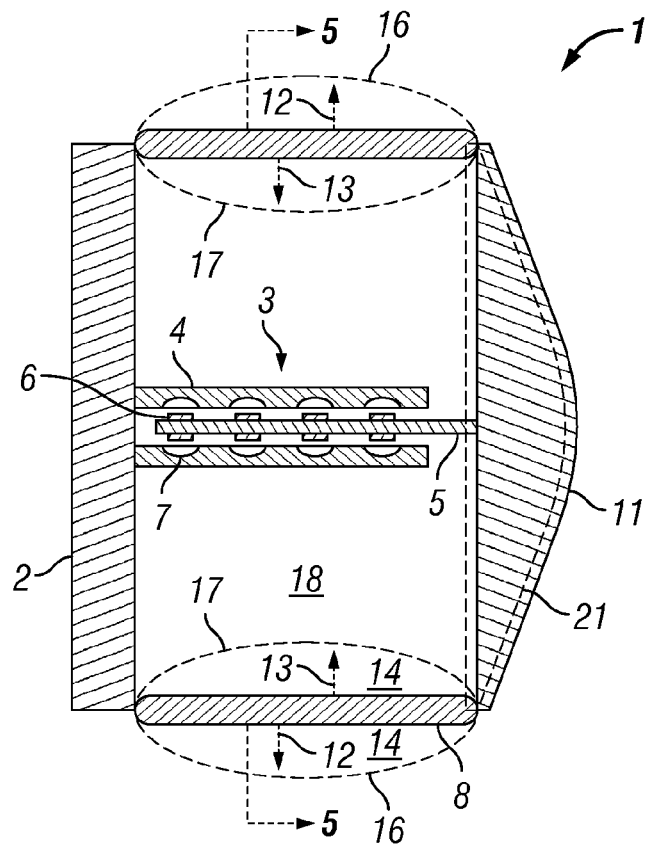
FIG. 1 is a side cross sectional schematic of an embodiment.
Figure 5:
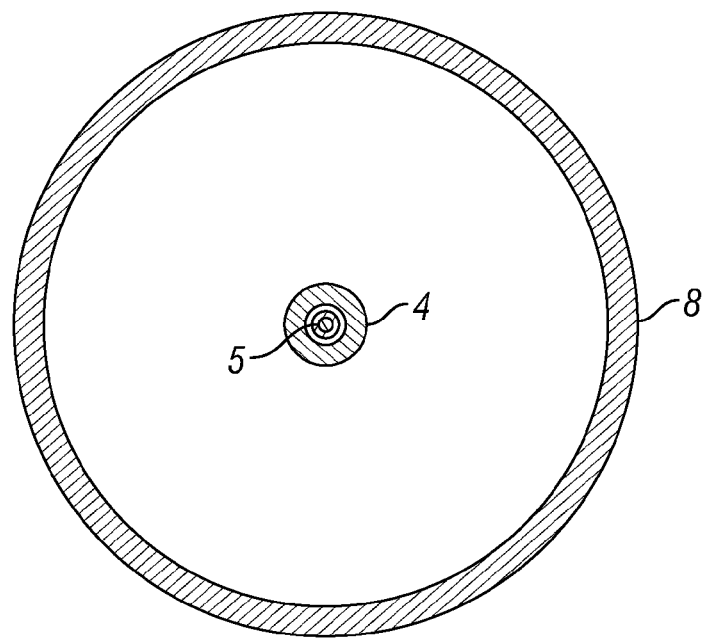
FIG. 5 is a top view cross sectional schematic of the embodiment shown in FIG. 1.

FIGS. 1 and 5 show a combination of embodied features according to the present disclosure. A marine vibrator 1 can have a housing 2. The housing 2 can be in many shapes such as tubular, square or cubic, round or spherical, or ovoid. Also, the housing 2 can be a single part or multiple parts that together form the housing 2. The housing can be a substantially flat member as shown in FIG. 1. A displacement member 8 (cross section thereof shown in FIG. 1) can interact with the housing 2. The displacement member 8 can be made from a flexible material such as rubber. As shown in FIG. 1, a linear electromagnetic motor 3 can be located in the vibrator 1 and have a piston 5 that fits in a guide 4. As part of the linear electromagnetic motor 3, the piston 5 can have incorporated therewith magnets 6 and the guide 4 can have incorporated therewith coils 7. This configuration can be reversed so that the guide 4 has incorporated therewith coils and the piston 6 has incorporated therewith magnets. The piston can comprise a piston cap 11 that moves with the piston 5. The linear electromagnetic motor 3 can be controlled by a controller (such as a digital controller or other servo motor controller)

located externally to the vibrator and not shown here. Electronic controllers are available commercially from Sercel and Inova. Also, linear electromagnetic motors applicable to the disclosed designs are commercially available and therefore not described in detail. The piston cap 11 can be stiff and interact with the displacement member 8. As the piston 5 is moved within the guide 4 by way of electromagnetic forces, the piston cap 11 moves and interacts with the displacement member 8 so that upon contraction of the piston 5 (to the position shown with dotted line 21) the displacement member 8 is compressed and flexed so that the displacement member 8 forms either a convex or a concave cross sectional shape. In FIG. 1 it is shown as forming a convex cross sectional shape by having the central part of the displacement member 8 move outward in the direction of the arrow 12. Otherwise, the displacement member 8 could move to a concave shape by having the central portion move inward in the direction of the arrow 13. One way to ensure that the displacement member moves to the correct position is by biasing the displacement member in the desired direction. This can be done in a number of ways. A spring element (not shown) could be used to exert a force against the displacement member to encourage its movement in the desired direction. Also, a force member could be positioned to apply force to the displacement member 8 biasing the displacement member 8 in either a convex or concave direction. Also, the displacement member 8 could be formed (molded) to have a bias toward either a convex shape or a concave shape. As the piston 5 moves inward and outward between a first and second position, the displacement member 8 is moved between a straight position (less convex or concave) as shown in FIG. 1, and a more convex or concave position as shown by the dotted lines 16, 17 thus providing a certain amount of displacement (stroke) to the external volume surrounding the vibrator 1. It is this displacement of a volume of fluid that produces a pressure pulse that travels through the water and into the Earth's subsurface to reverberate and then be recorded as part of a seismic survey. FIG. 1 shows the displacement member 8 and the piston 5 sharing a central axis.

FIG. 1 illustrates the volume displacement 14 of the vibrator 1 with dotted lines 16, 17 which define the stroke and subsequent volume displacement 14 of the displacement member 8. As noted earlier, the stroke can be from a straight position to a concave position, or to a convex position. Also, the displacement member could be biased in either the concave position or the convex position and move to the straight position by applying tension.

Also, with respect to FIG. 1, one vibrator is shown, however a matching (mirror) vibrator could be added on the opposite side of the housing 2, or otherwise connected therewith so that two linear electric motors 3 are incorporated opposite to one another, having the vibrator 1 in FIG. 1 being configured so as to be back-to-back with another vibrator 1.

Figure 6:
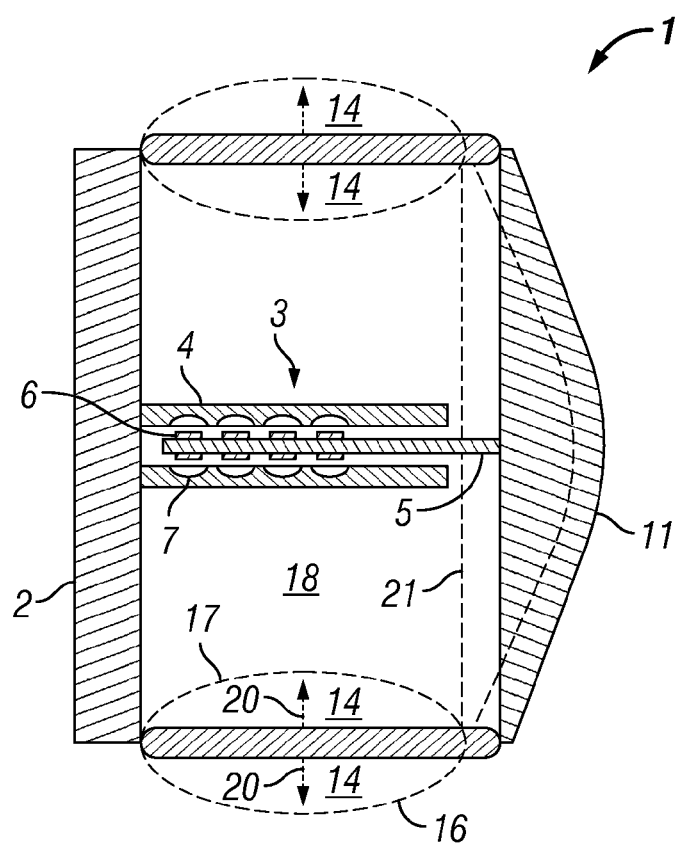
FIG. 6 is a side cross sectional schematic of an embodiment.

As shown in FIG. 6, instead of the displacement member taking either a convex or a concave shape, the displacement member 8 can be compressed longitudinally thus expanding both outward and inward (the middle part becoming thicker) in the direction of arrows 20, while the piston cap 11 moves from the initial position to the retracted position marked with dotted line 21. According to this embodiment, the stroke of the displacement member 8 covers the volume 14 illustrated with dotted lines 16, 17. The displacement member 8 in that case can be a solid flexible part or can be a hollow tubular part.

Figure 2:
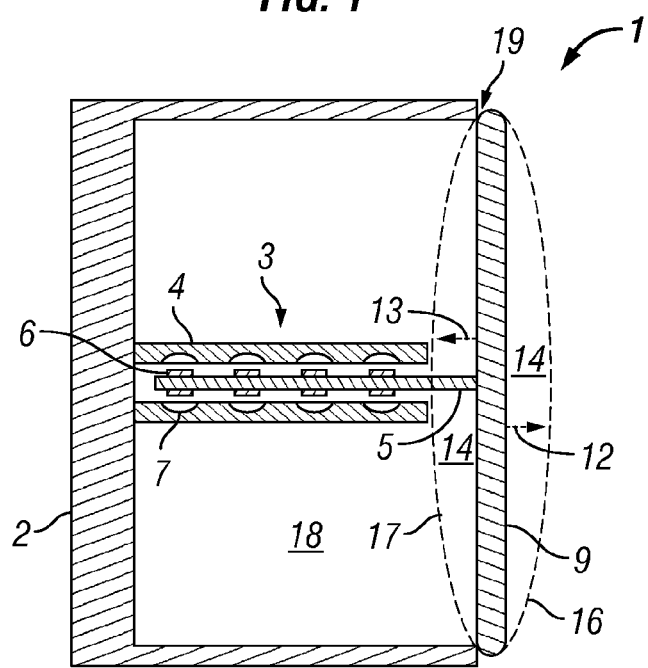
FIG. 2 is a side cross sectional schematic of an embodiment.

As shown in FIG. 2, a housing 2 can have a concave cross sectional shape, and the piston 5 can be connected with a displacement member 9 that is in a disk shape. The displacement member 9 can be made from rubber and be flexible, but could be made from other flexible materials. The displacement member 9 can have an outer perimeter location 19 that connects with the housing so that as the piston 5 moves in and out between a first and second position, the displacement member 9 cycles between having a convex shape (shown by dotted line 16) and a concave shape (shown by dotted line 17), thus producing a displacement 14 of the external volume to the vibrator. The displacement member 9 can also cycle between the flat position (as shown in FIG. 2) and either the convex or concave position (as shown by dotted lines 17, 16) to produce the displacement 14. The displacement produces an energy pulse that travels through the water and into the Earth's subsurface to reverberate and then be recorded as part of a seismic survey.

FIG. 2 illustrates the volume displacement 14 of the vibrator 1 with the dotted lines 16, 17 which define the stroke and subsequent volume displacement 14 of the disk shaped displacement member 9. In the embodiment in FIG. 2, the disk shaped displacement member 9 can move between a flat position, a concave position and a convex position as the piston 5 moves in and out in response to forces provided by the linear electromagnetic motor 3. It should be appreciated that while the displacement member 9 is shown as being a circular disk shape that numerous other variations such as ovals or rectangular shapes are possible. FIG. 2 shows the displacement member 8 and the piston 5 sharing a central axis.

Figure 3:
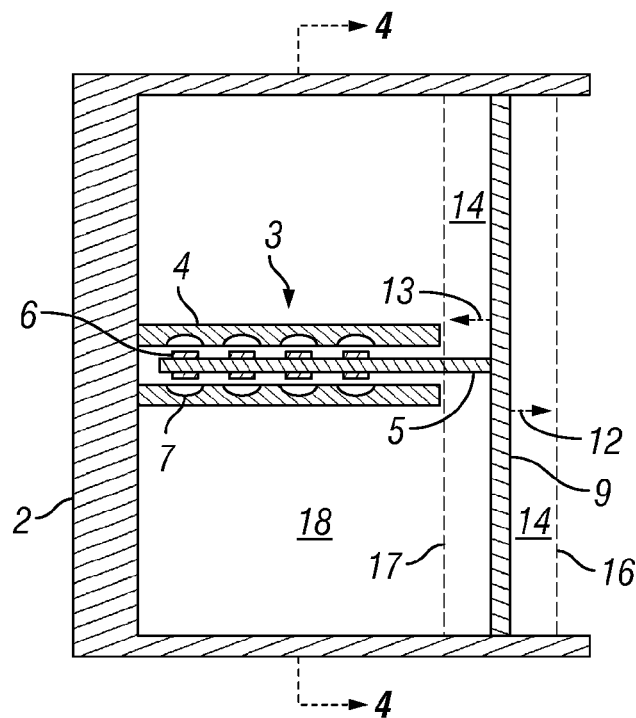
FIG. 3 is a side cross sectional schematic of an embodiment.
Figure 4:
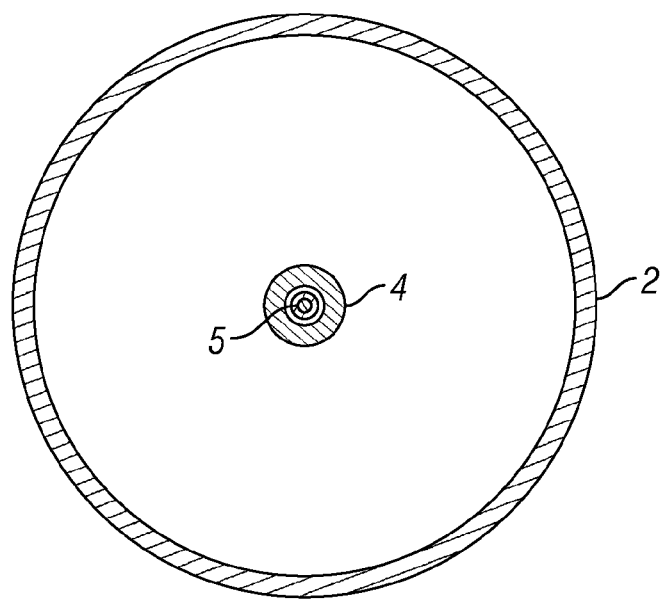
FIG. 4 is a top view cross sectional schematic of the embodiment shown in FIG. 2.

FIGS. 3 and 4 show a marine vibrator having a housing 2 and a linear electromagnetic motor 3. The linear electromagnetic motor 3 has a guide part 4 and a piston part 5. The piston part 5 comprises a displacement member 9. The displacement member 9 interacts with the housing 2 so that the displacement member 9 is in sealing contact with the inside diameter of the housing 2 and slides in and out within the housing 2. The stroke of the displacement member 9 covers a volume 14 therefore displacing fluid external to the vibrator 1 and this displacement produces a pulse that travels through the water and into the Earth's subsurface to reverberate and then be recorded as part of a seismic survey. In FIG. 3 the stroke is illustrated with the dotted lines 16, 17 and shows the displacement volume 14. In the embodiment the displacement member is shown as being a rigid member. The guide 4 substantially surrounds the piston 5. In another embodiment the displacement member 9 can, instead of being in sealing and sliding contact with the housing 2, have a flexible member connecting between the housing 2 and the displacement member 9.

According the present embodiments, a linear electromagnetic motor powered marine vibrator can produce volume displacement of at least 25 L (liters) of fluid per cycle (per stroke), a cycle being stroke between a first position (such as retracted) and a second position (such as extended) of a displacement member along its stroke. According to embodiments, designs can have the volume displacement be at least 50 L of fluid per cycle. In connection with the volume displacements, according to various embodiments, a vibrator with a linear electromagnetic motor can actuate within a range of 1-200 Hz or more. According to an embodiment, a vibrator with a linear electromagnetic motor can actuate at 1-15 Hz with a fluid displacement per stroke of at least 25 L. According to another embodiment, a vibrator with a linear electromagnetic motor can actuate at 1-15 Hz with a displacement per stroke of at least 50 L. Also, according to various embodiments, the average acceleration of the piston during operation can be approximately 13 Gs, but can be within a range of 5-20 Gs depending on the design. Also, the piston weight can be approximately 170 Kgs, but can be as low as 100 Kgs and has high as 200 Kgs depending on the design. In use with a seismic survey, embodiments of the vibrator disclosed herein can be towed by a tow vessel. The tow vessel can also tow seismic streamers. Seismic streamers are elongated cables that contain electronics for detecting seismic signals that are produced by seismic sources such as vibrators. The streamers can also be towed by vessels other than those towing the vibrator. However, use of the vibrator is not limited to that configuration as it can be used in any application where it imparts pulses to the water that travel into the Earth, are reflected and are received by seismic sensors.

The preceding description is meant to aid in the understanding of one skilled in the art with respect to various combinations of embodied features described herein. It is not meant in any way to unduly limit the scope of any claims connected to this or subsequent related applications.

What is claimed is:

1. A marine vibrator, comprising:
   a housing;
   a displacement member that interacts with the housing, thereby defining an internal volume, the displacement member having a retracted position and an extended position;
   a linear electromagnetic motor that interacts with the displacement member and alternates the displacement member between the retracted position and the extended position, wherein the linear electromagnetic motor comprises a piston and a guide for the piston, the piston being in connection with the displacement member and the guide having incorporated therewith electromagnetic coils and the piston having incorporated therewith magnets, so that as a magnetic field of the motor changes by direction from a controller, the piston has forces applied thereto and moves linearly within the guide.

2. The marine vibrator of claim 1, comprising a piston having a piston cap that interacts with the displacement member and the housing thereby defining the internal volume.

3. The marine vibrator of claim 1, wherein the volume covered by the stroke from the retracted position to the extended position is at least 25 L.

4. The marine vibrator of claim 1, wherein the piston is connected with the displacement member.

5. The marine vibrator of claim 1, wherein the displacement member is a flexible tubular shaped member.

6. The marine vibrator of claim 1, wherein the displacement member extends around the piston.

7. The marine vibrator of claim 6, wherein the flexible tubular shaped member and the piston share a central axis.

8. The marine vibrator of claim 1, wherein the piston comprises a disk shaped member that is near an end of the piston that is distal from the portion of the piston that interacts with the guide.

9. The marine vibrator of claim 8, wherein the disk shaped member connects with the displacement member.

10. The marine vibrator of claim 1, wherein the piston connects with a displacement member that is disk shaped and is flexible, wherein the displacement member interacts with the housing.

11. The marine vibrator of claim 10, wherein when in the retracted position the displacement member is in a concave shape and when in the extended position the displacement member is in a convex shape.

12. The marine vibrator of claim 1, wherein the volume covered by the stroke from the retracted position to the extended position is at least 50 L.

13. A method of marine seismic exploration, comprising:
    operating a marine vibrator that has a housing and a displacement member, the housing and the displacement member together defining an internal volume that is separate from an external volume;
    driving a linear electromagnetic motor to move the displacement member between a retracted position and an extended position wherein the volume covered by a stroke between the retracted position and the extended position is at least 25 L and the frequency of the stroke is in the range of 1-15 Hz, wherein the linear electromagnetic motor comprises a piston and a guide for the piston, the piston being in connection with the displacement member and the guide having incorporated therewith electromagnetic coils and the piston having incorporated therewith magnets, so that as a magnetic field of the motor changes by direction from a controller, the piston has forces applied thereto and moves linearly within the guide.

14. The method of claim 13, wherein a piston, the housing and the displacement member together define the internal volume.

15. The method of claim 13, wherein the volume covered by the stroke between the retracted position and the extended position is at least 25 L and the frequency of the stroke is in the range of 1-20 Hz.

16. The method of claim 13, wherein the volume covered by the stroke between the retracted position and the extended position is at least 50 L and the frequency of the stroke is in the range of 1-15 Hz.

17. The method of claim 13, wherein the volume covered by the stroke between the retracted position and the extended position is at least 50 L and the frequency of the stroke is in the range of 1-20 Hz.

* * * * *